July 25, 1961  A. WEISHAUS  2,993,431
HEATING DEVICE

Filed Nov. 26, 1958  3 Sheets-Sheet 1

INVENTOR:
Albert Weishaus,

BY Davarn, Tilton, Fallon & Lungmus,
ATTORNEYS.

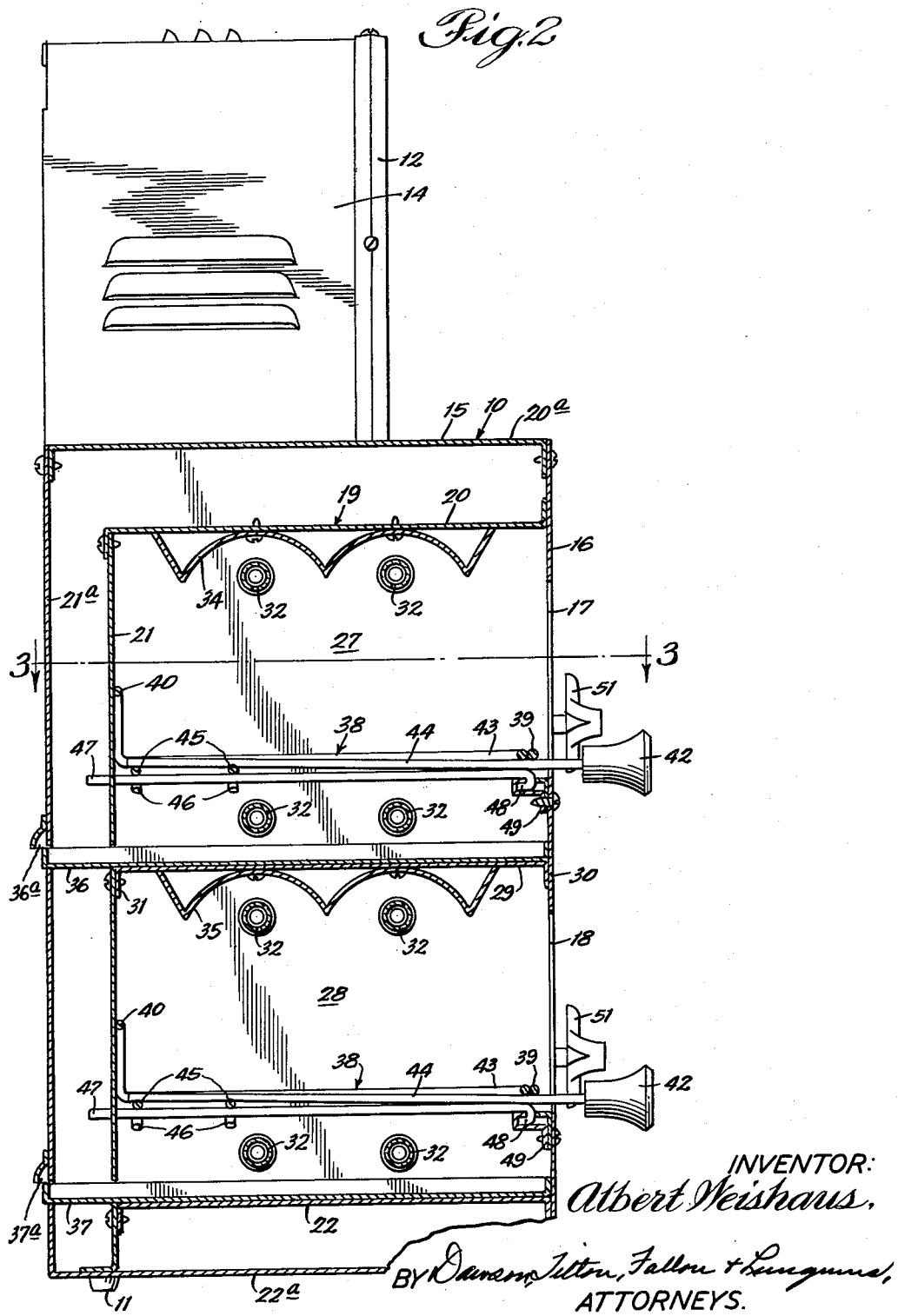

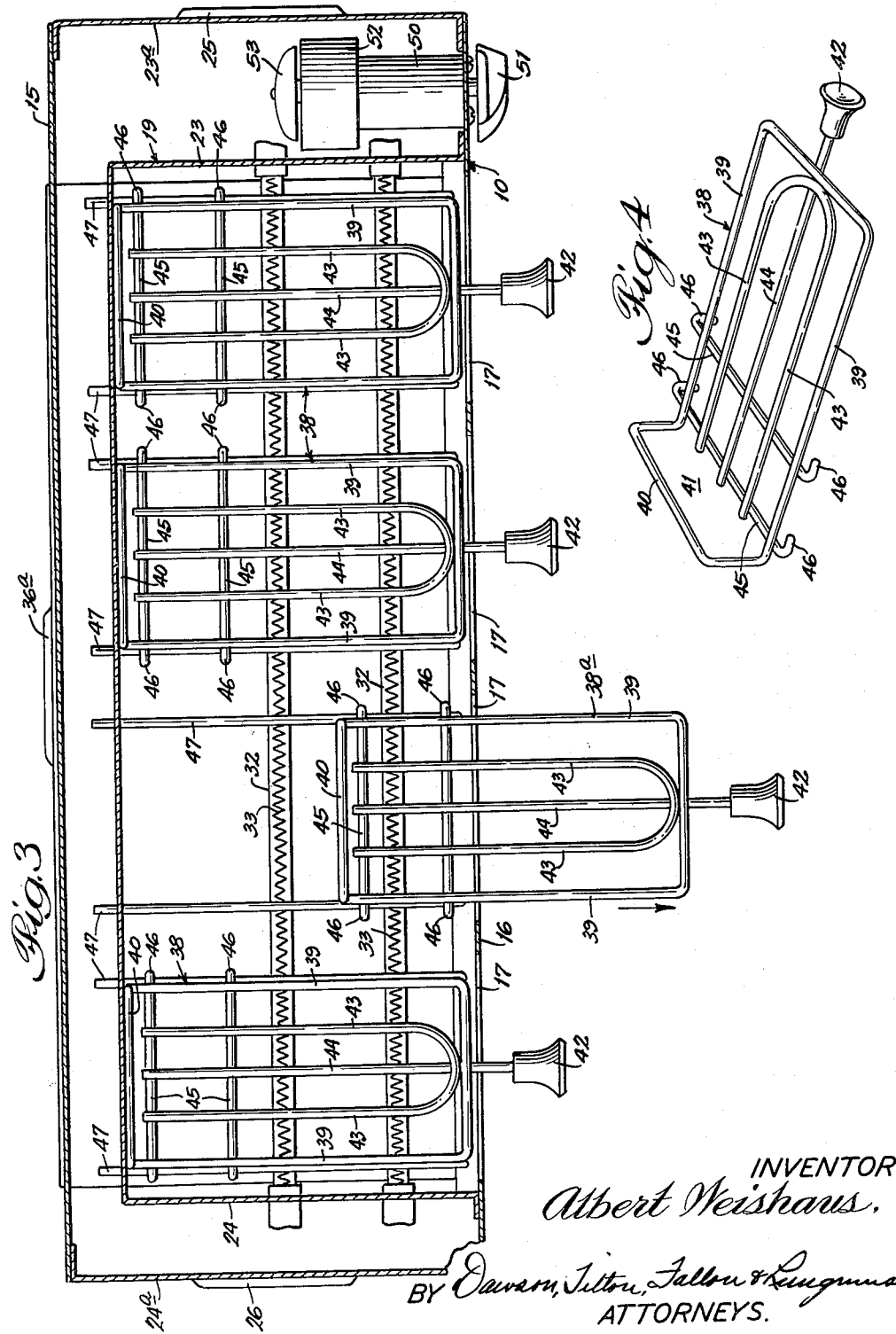

United States Patent Office 2,993,431
Patented July 25, 1961

2,993,431
HEATING DEVICE
Albert Weishaus, 7825 S. Luella Ave., Chicago, Ill.
Filed Nov. 26, 1958, Ser. No. 776,620
6 Claims. (Cl. 99—391)

This invention relates to a heating device, and, more particularly, to a heating device employing radiant heat for the warming of packaged foods such as sandwiches, and the like.

It is a principal object of this invention to provide a novel heating device for packaged foods which finds utility in stores, places of entertainment, etc., wherein an individual purchases uncooked food. Another object is to provide a heating device employing radiant heat for the rapid heating of cool or refrigerated goods. Still another object is to provide a heating device for rapid heating of packaged foods, or the like, in which a novel enclosure construction provides highly efficient heating with a minimum of danger to the person using the same and the surroundings. Yet another object is to provide a unique radiant heating device for packaged foods in which a self-cooling casing is provided.

A further object is to provide a radiant heating device adapted to simultaneously heat a number of individual objects and with a minimum of danger to the users thereof. A still further object is to provide a novel heating enclosure in which radiant heating means are provided and in which individual trays of novel construction are selectively retractable from the heating enclosure by the individuals using the same.

Another object is to provide a generally rectangular hollow-walled casing equipped with exterior louvers and heat-reflective clean-out trays. Still another object is to provide a casing of the character described in the object immediately preceding in which food-supporting trays of unique construction are provided which minimize danger of burning of the users of the equipment while cooperating with the equipment to provide a highly efficient operation. Other objects and advantages of this invention can be seen as this specification proceeds.

The invention will be explained in conjunction with an illustrative embodiment as shown in the accompanying drawing, in which—

FIG. 2 is an enlarged, part-sectional view, taken along the line 2—2 of FIG. 1;

FIG. 3 is a cross-sectional view taken along the line 3—3 of FIG. 2; and

FIG. 4 is a perspective view of the food-supporting pull-out tray elements seen in top plan view in FIG. 3.

Figure 1:
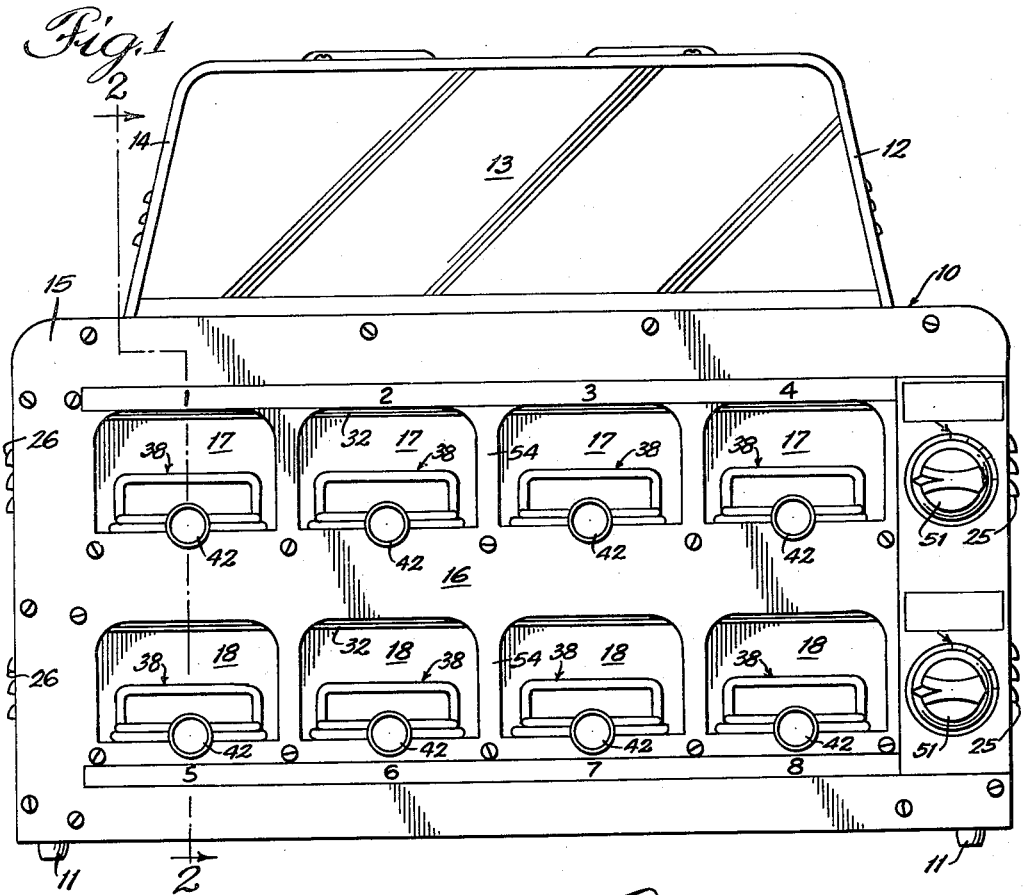
FIG. 1 is a front elevational view of a heating device employing the teachings of this invention.

In the illustration given, the heating device pictured in FIGS. 1, 2 and 3 is designated generally by the numeral 10. The heating device, as clearly seen in these three views, is generally rectangular in shape, with the long dimension disposed horizontally, as can be appreciated from the supporting legs 11 (seen only in FIGS. 1 and 2) attached to the bottom of the device 10. Optionally, the device 10 may be equipped with a display panel 12 (also seen only in FIGS. 1 and 2), in which a translucent wall 13 bears advertising material (not shown) and is illuminated by light bulbs, or the like (not shown) supported within a generally trapezoidal-shaped housing 14. The panel 12 optionally may be secured to the device 10 as desired.

Referring now to the device 10 and, more particularly, the view thereof seen in FIG. 2, it is seen that the device includes an outer enclosure or casing 15 which may be constructed of sheetmetal such as aluminum, steel, etc. As mentioned before, the casing is generally rectangular in shape, with the long dimension disposed horizontally and with one of the larger, vertically-extending walls 16 providing the front of the enclosure 15. The front wall 16 is apertured as at 17 and 18 to provide access to the interior of casing 15 from the front. In the illustration given, the front wall 16 is equipped with two sets of openings 17 and 18, each set including four openings arranged in horizontal, side-by-side relation. Adjacent each opening, as seen only in FIG. 1, is a numeral serving to identify the particular opening in question. In the illustration given, the numerals are arranged consecutively, running from left to right in the two rows, and are identified by the numerals 1 to 8.

Interiorly, the casing 15 (again as best seen in FIG. 2) is equipped with a second casing provided by walls that are adjacent to, but spaced from, the top, bottom, side and rear walls of casing 15. The second casing is designated generally by the numeral 19 and is made up of a top wall 20 spaced below the top wall 20a of casing 15. The second or interior casing 19 includes a rear wall 21 spaced inwardly of the rear wall 21a of casing 15. As also seen in FIG. 2, casing 19 includes a bottom wall 22 spaced upwardly from the bottom wall 22a of casing 15. The interior casing 19 is completed by end walls 23 and 24, spaced inwardly of end walls 23a and 24a of casing 15 (seen only in FIG. 3). The walls 20, 22, 23 and 24 of casing 19 extend forwardly to join the front wall 16 of casing 15, so the front wall of casing 15 is the only non-hollow wall provided in device 10.

The side walls 23a and 24a of casing 15 are equipped with louvers 25 and 26, respectively (seen only in FIGS. 1 and 3).

In the illustration given, wherein two horizontal rows of openings 17 and 18 are provided, casing 19 is divided into two corresponding compartments 27 and 28 (identified only in FIG. 2) by means of a partition plate 29. Partition plate 29 (as seen in FIG. 2) is secured to the front wall 16 of casing 15 as at 30 and to the rear wall 21 of casing 19 as at 31.

Each compartment 27 and 28 is provided with heating means in the form of radiant heating elements 32. The radiant heating elements may take any form convenient, for example, they may include glass tubes extending longitudinally of the casing 19 which house Nichrome wires 33 (best seen in FIG. 3). As best seen in FIG. 2, the top wall 20 of the interior casing 19 and the partition 29 are each equipped with a depending arcuate reflector identified by the numerals 34 and 35, respectively. Thus, the radiant heat issuing from the elements 32 adjacent reflectors 34 and 35 is reflected downwardly and toward the center of compartments 27 and 28.

Figure 5:
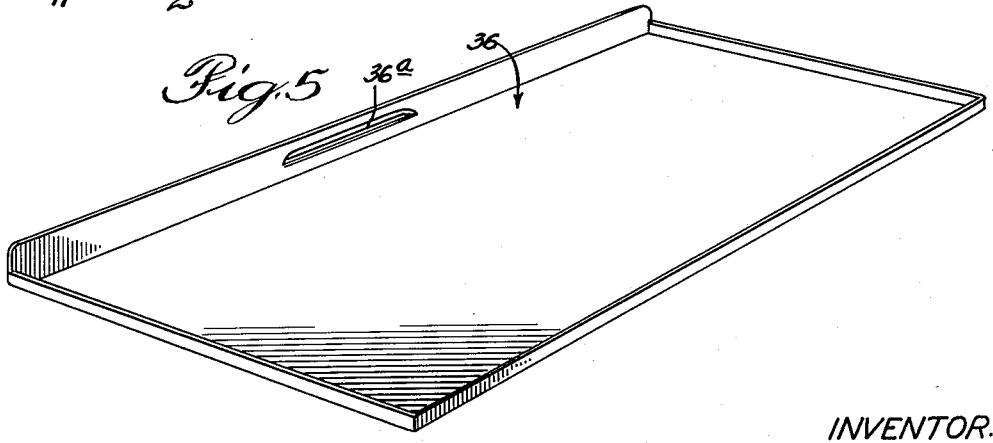
FIG. 5 is a perspective view of a clean-out tray employed in conjunction with the heating device.

Positioned for slidable movement within casings 19 and 15 and below the lower set of heating elements 32 in each compartment 27 and 28, are clean-out trays 36 and 37, respectively. The clean-out trays are identical in size and shape, and one of these is seen in FIG. 5 and identified by the numeral 36. The trays are constructed of heat-reflective material so that they cooperate with the adjacent heating elements 32 in reflecting radiant heat upwardly and again toward the central interior of the compartments 27 or 28, as the case may be. Food inadvertently falling or spattering from the supporting trays (designated generally by the numeral 38 in FIG. 2) is deposited on the trays 36 and 37. These clean-out trays 36 and 37, being easily removable, permit ready cleaning, so that the device 10 has an attractively clean interior. At the same time, the cleaning operation performed on the clean-out trays 36 and 37 renews the heat-reflective surface so as to improve the efficiency of the heating operation.

Referring now to FIG. 4, the tray 38 is seen in perspective view. The tray 38 is seen to be constructed of wirelike members arranged to form a perimetric frame 39, with the inner end raised as at 40 to provide a bumper or vertically-extending, apertured rib. The inner end 40, as seen in FIG. 2, abuts the rear wall 21 of the interior casing 15 when the tray 38 is wholly inserted into the device 10. The central aperture 41 in the rear end of tray 38 (as identified in FIG. 4) permits reflected radiant heat to enter the vertical sides of the article to be heated as well as the top and bottom sides.

The tray 38 is also equipped with a handle 42 constructed of a thermal insulating material, which at all times is positioned exteriorly of the device 10, as can be appreciated from a consideration of FIG. 3, wherein one tray 38a is seen in a retracted position.

Again referring to FIG. 4, the perimetric frame is seen to include interior wire elements 43 and 44 that further cooperate to reinforce the tray 38 and give it a grid-like or apertured appearance. The element 44 is seen to be extended and provides the means for mounting knob or handle 42. The tray frame also includes a pair of transverse wire or rod-like members 45 which are curved at the ends thereof as at 46. The curved end portions 46 of wires 45 provide the means for slidably mounting the trays within the device 10 and, as best seen in FIG. 3, are shown in gripping engagement with rods 47. The rods 47 extend transversely of the casing 19 and normal to the front wall 16 of casing 15. Each rod 47 is curved at its front end as at 48 (seen only in FIG. 2) and is secured within a channel-like bracket 49 secured to the front wall 16. The rear ends of rod 47 are supported by the rear wall 21 of casing 19 by extending therethrough.

A pair of rods 47, horizontally spaced apart, is provided for each opening 17 or 18, as the case may be. The tray 38 associated with each pair of rods is arranged for sliding, horizontal movement relative to the casing 15 through the particular opening 17 or 18 with which the tray is associated.

It is believed that the invention can be more fully understood from a consideration of the operation thereof. Such a description follows.

*Operation*

In the operation of the device, electrical current is provided through a conductor (not shown) to an electric switch 50 (seen only in FIG. 3) and which is equipped with an "on-off" knob 51. In the illustration given, the device 10 includes two such switches, as can be inferred from the two knobs 51 seen in FIGS. 1 and 2. One knob 51 and its associated switch 50 is utilized to provide heat for each compartment 27 and 28 through the heating elements 32 contained therein. When the knob 51 is in the "off" position as shown, no electric current is delivered to the heating elements 32. However, electrical current may be delivered to the advertising panel 12 so as to illuminate it and attract the attention of potential users. When a person desires to cook a sandwich, French fried potatoes, pizza, etc., whether packaged or otherwise, he merely retracts any given tray 38 as desired to the position occupied by tray 38a in FIG. 3. The user thereupon places the article to be heated upon the tray and advances the tray to a position within the interior casing 19 (the positions occupied by the other three trays 38 seen in FIG. 3). Thereafter, the knob 51 is rotated a distance corresponding to calibrations on the front panel to set a clock 52 in operation and which times the cooking. At the completion of the prescribed time, the clock 52 causes a bell 53 (seen only in FIG. 3) to be rung.

The ringing of the bell signals that the heating operation is completed, and the user of the device thereupon can retract the tray 38 to the position indicated by the tray 38a in FIG. 3 and removed the heated article.

Through the provision of the tray arrangement described, it is possible for the user to have the tray in the retracted position shown and designated by the numeral 38a both at the time of placing the article to be cooked on the tray and at the time the article is removed. This advantage becomes more apparent when it is appreciated that other persons desiring articles to be cooked may use the device simultaneously with the first user. All that is necessary for a second or subsequent user to do is to retract one of the unfilled trays and place his food on it. There is no need for the second user to reach inside of the heated compartment 27 or 28 to either insert or remove the article in question.

The numerals applied to the various openings 17 and 18 permit a user to quickly and accurately determine which tray carries the food or other article that he desires to be cooked. This is important when the user in question is not the one to have set the clock 52, so that the user would not ordinarily know when the cooking period is finished. In the use of the device, all that the second user need do is remember the number of the compartment and time his own cooking period.

The device 10 may be in continuous operation over prolonged periods and thus generate considerable heat. Danger to the surroundings or to the persons using the device is substantially minimized through the use of the hollow wall construction of the box-like device 10. The side walls 23a and 24a of casing 15, being equipped with louvers 25 and 26, respectively, permit air circulation within the space between casings 15 and 19 so as to prevent the outer side walls 23a and 24a from becoming untouchably hot. The same air circulation is achieved relative to the space between the rear walls 21 and 21a of casings 19 and 15, respectively, through the access slots 36a and 37a for clean-out trays 36 and 37, respectively. The spaces between the top walls 20 and 20a of the casings and the bottom walls 22 and 22a communicate the hollow walls ventilated as described above so that again heat accumulations on the exterior walls are minimized. The wall 16 of casing 15 providing the front thereof is preferably constructed with its interior heat reflective, especially in the portions 54 between adjacent openings 17 or 18, as the case may be. The interior heat-reflective surfaces of the front wall 16, in combination with the reflective surfaces provided by the interior walls of casing 19, concentrate the heat on the article to be cooked. After a number of articles have been cooked and some spattering or deposit has occurred on the clean-out trays 36 and 37, these clean-out trays can be conveniently removed through the slots in the rear wall 21a for cleaning. Cleaning of the trays 36 and 37, as pointed out above, also serves to renew their heat-reflective surfaces, thus further contributing to the efficiency of operation of the device 10.

While, in the foregoing specification, a detailed description of an embodiment of the invention has been given for the purpose of clearly explaining the invention, many variations in the details thereof will be perceived by those skilled in the art without departing from the spirit and scope of the invention.

I claim:

1. In a radiant heating device, a generally rectangular, box-like enclosure having interconnected front, rear, end, top and bottom walls, said front wall being equipped with a plurality of access apertures, each of said walls except said front wall being equipped with an associated interior wall surface, each interior wall surface being mounted in said enclosure in spaced-apart, parallel relation with its associated wall, said interior wall surfaces being interconnected to define a generally rectangular casing within said enclosure with spaces existing between said casing, and all of said enclosure walls but said front wall, said interior wall surfaces and said front wall being constructed of heat-reflective material, at least two vertically spaced-apart, horizontally-extending radiant heating elements mounted in said enclosure parallel to said front wall, a plurality of pairs of rods mounted in said enclosure and extending transversely of said front wall between said heating elements, each pair of rods being positioned adjacent an access aperture for supporting material introduced through the said adjacent aperture, said rods being all disposed in a common horizontal plane, a grid-like, article-supporting tray slidably mounted on each pair of rods, each of said trays being equipped with a handle extending through said front wall when the trays are completely received within said enclosure, each of said trays being equipped with a rear bumper, and a clean-out tray having a heat-reflective upper surface extending through the rear wall of said enclosure and the interior wall surface associated with said rear wall and positioned below the lower heating element, the end walls of said enclosure being equipped with louvers.

2. In a heating device for packaged foods, and the like, a generally rectangular, box-like enclosure having front, rear, end, top, and bottom walls, each of said walls except said front wall being equipped with an associated interior wall surface, each interior wall surface being mounted in said enclosure in spaced-apart, parallel relation with its associated wall, said interior wall surfaces being interconnected to define a generally rectangular casing within said enclosure with spaces existing between said casing and all of said enclosure walls but said front wall, a plurality of sets of openings in said front wall, each set comprising a plurality of openings arranged in horizontal, side-by-side relation, a plurality of horizontally-extending heating elements in said casing arranged above and below each set of openings, a horizontally-extending partition in said casing between each set of openings, each partition and the top wall surface of said casing being equipped with an arcuate reflector above the upper heating element associated with each set of openings, clean-out trays slidably mounted in said casing through aligned, horizontally-extending slots in the enclosure rear wall and the rear wall surface of said casing, said clean-out trays being positioned below the lower heating elements associated with each set of openings and having a heat-reflective upper surface, the end walls of said enclosure being equipped with louvers, and heating element control means in the space between one end wall and said casing, said heating element control means extending through said front wall, and a plurality of grid-like pull-out trays slidably mounted in said casing, one for each opening, said pull-out trays being only partially removable from said casing through said front wall, each of said pull-out trays being equipped with an upstanding rear bumper.

3. The structure of claim 2 in which the said casing is equipped with a plurality of pairs of rods extending transverse to said front wall, a pair of rods for each opening and positioned immediately below the opening, one of said pull-out trays being slidably supported on each pair of rods, each pull-out tray comprising an open wire grid of generally rectangular configuration.

4. In a device for heating foods, and the like, a generally rectangular, box-like enclosure having front, rear, end, top and bottom walls, each of said walls except said front wall being equipped with an associated interior wall surface, each interior wall surface being mounted in said enclosure in spaced-apart, parallel relation with its associated wall, said interior wall surfaces being interconnected to define a generally rectangular casing within said enclosure with spaces existing between said casing and all of said enclosure walls but said front wall, the rear and end wall surfaces of said casing and said front wall being constructed of heat-reflective material, a plurality of sets of openings in said front wall, each set comprising a plurality of openings arranged in horizontal, side-by-side relation, the front wall being equipped with identifying indicia for each opening, a plurality of horizontally-extending heating elements in said casing arranged above and below each set of openings, a horizontally-extending partition in said casing between each set of openings, each partition in the top wall surface of said casing being equipped with an arcuate reflector above the upper heating element associated with each set of openings, clean-out trays slidably mounted in said casing and aligned, horizontally-extending slots in the rear wall surface of said casing and said rear wall, said clean-out trays being positioned above and adjacent said partition and the bottom wall surface of said casing, said trays also being constructed of heat-reflective material, the end walls of said enclosure being equipped with louvers, and heating element control means in the space between one of said end walls and said casing, said heating element control means extending through said front wall, and a plurality of grid-like pull-out trays slidably mounted in said casing, one for each of said openings, said pull-out trays being only partially removable from said casing through said front wall, each of said pull-out trays being equipped with an apertured, upwardly-extending bumper at the inner end thereof.

5. In apparatus of the character described, a generally rectangular box-like enclosure having front, rear, end, top, and bottom walls, each of said walls except said front wall being equipped with an associated interior wall surface, each interior wall surface being mounted in said enclosure in spaced-apart, parallel relation with its associated wall, said interior wall surfaces being interconnected to define a generally rectangular casing within said enclosure with spaces existing between said casing and all of said enclosure walls but said front wall, the rear and end wall surfaces of said casing and said front wall being constructed of heat-reflective material, a plurality of sets of openings in said front wall, each set comprising a plurality of openings arranged in horizontal, side-by-side relation, the front wall being equipped with identifying indicia for each opening, a plurality of horizontally-extending heating elements in said casing arranged above and below each set of openings, a horizontally-extending partition in said casing between each set of openings, each partition in the top wall surface of said casing being equipped with an arcuate reflector above the upper heating element associated with each set of openings, clean-out trays slidably mounted in said casing through aligned, horizontally-extending slots in the rear wall surface of said casing and said rear wall, said clean-out trays being positioned above and adjacent the said partition and the bottom wall surface of said casing, the trays also being constructed of heat-reflective material, the end walls of said enclosure being equipped with louvers, and heating element control means in the space between one end wall and said casing, said heating element control means extending through said front wall, said casing being equipped with a plurality of pairs of rods extending transverse to said front wall, a pair of rods for each opening and positioned immediately below the opening, and a food-supporting, retractable tray supported on each pair of rods, each food-supporting tray comprising a rectangular wire frame having at least one side raised, the raised side being adjacent the rear of said casing, the frame being equipped with a handle extending through the opening associated with the tray when the tray is positioned with its raised side abutting the rear wall surface of said casing, said frame also being equipped with wire members extending transversely of said rods, said transversely-extending wire members being curved at the ends thereof about said rods to grip said rods for sliding movement and prevent complete retraction of said tray from said casing.

6. In apparatus of the character described, a generally rectangular enclosure defined by the interconnected front and hollow top, bottom, end, and rear walls, said enclosure being equipped with a heat-reflective interior, horizontally-extending radiant heating elements mounted in said enclosure, said front wall being equipped with a plurality of tray-receiving openings, a pair of horizontally spaced-apart members mounted in said enclosure for each of said openings and extending between said front and rear walls, a plurality of grid-like trays mounted in said enclosure for sliding, horizontal movement transverse of said front wall and between said heating elements, each of said trays being equipped at its front end with a knob extending exteriorly of said front wall and at its rear end with an upstanding apertured bumper, each of said trays being constructed of a plurality of lengths of heavy metal wire, said wire being upwardly formed to provide said bumper, said tray being equipped with a wire extending transverse of said members adjacent the rear end thereof in sliding engagement with said members, said transverse wire being curved about said members to prevent detachment therefrom.

References Cited in the file of this patent

UNITED STATES PATENTS

| | | |
|---|---|---|
| 1,480,084 | Lamb | Jan. 8, 1924 |
| 1,522,818 | Grouleff et al. | Jan. 13, 1925 |
| 1,599,560 | Ehrgott | Sept. 14, 1926 |
| 1,862,733 | Wright | June 14, 1932 |
| 1,900,249 | Miller et al. | Mar. 7, 1933 |
| 1,955,026 | Savage | Apr. 17, 1934 |
| 2,283,182 | Carl | May 19, 1942 |
| 2,604,032 | Dooley | July 22, 1952 |
| 2,719,479 | Rodwick | Oct. 4, 1955 |
| 2,804,818 | March | Sept. 3, 1957 |